US008442891B2

(12) United States Patent
Mendelsohn

(10) Patent No.: US 8,442,891 B2
(45) Date of Patent: May 14, 2013

(54) INTERMARKET ANALYSIS

(75) Inventor: Louis B. Mendelsohn, Wesley Chapel, FL (US)

(73) Assignee: Predictive Technologies Group, LLC, Wesley Chapel, FL (US)

( * ) Notice: Subject to any disclaimer, the term of this patent is extended or adjusted under 35 U.S.C. 154(b) by 338 days.

(21) Appl. No.: 12/632,186

(22) Filed: Dec. 7, 2009

(65) Prior Publication Data

US 2011/0137781 A1    Jun. 9, 2011

(51) Int. Cl.
*G06Q 40/00*    (2012.01)
(52) U.S. Cl.
USPC .............................. 705/36 R; 705/35; 705/37
(58) Field of Classification Search ............... 705/35–37
See application file for complete search history.

(56) References Cited

U.S. PATENT DOCUMENTS

| | | | |
|---|---|---|---|
| 5,444,819 A | 8/1995 | Negishi | |
| 5,761,442 A | 6/1998 | Barr et al. | |
| 6,236,977 B1 | 5/2001 | Verba et al. | |
| 6,453,303 B1 | 9/2002 | Li | |
| 6,735,580 B1 | 5/2004 | Li et al. | |
| 6,907,403 B1 | 6/2005 | Klein et al. | |
| 7,076,461 B2 | 7/2006 | Balabon | |
| 7,328,182 B1 | 2/2008 | Yahil et al. | |
| 7,356,504 B2 | 4/2008 | Mueller | |
| 7,467,108 B2 | 12/2008 | Papka | |
| 7,529,703 B2 * | 5/2009 | Benzschawel et al. ..... | 705/36 R |
| 2002/0007331 A1 | 1/2002 | Lo et al. | |
| 2002/0099636 A1 | 7/2002 | Narumo | |
| 2003/0078850 A1 * | 4/2003 | Hartman et al. ................ | 705/26 |
| 2003/0135445 A1 | 7/2003 | Herz et al. | |
| 2003/0149648 A1 | 8/2003 | Olsen et al. | |
| 2003/0182250 A1 | 9/2003 | Shihidehpour et al. | |
| 2004/0236667 A1 * | 11/2004 | Cotton ............................ | 705/37 |
| 2005/0021436 A1 | 1/2005 | Dowling | |
| 2005/0038729 A1 * | 2/2005 | Hsu et al. ........................ | 705/37 |
| 2005/0090911 A1 | 4/2005 | Ingargiola et al. | |
| 2005/0091146 A1 | 4/2005 | Levinson | |
| 2005/0091147 A1 | 4/2005 | Ingargiola et al. | |
| 2005/0131790 A1 | 6/2005 | Benzschawel et al. | |

(Continued)

OTHER PUBLICATIONS

"The truth about intermarket analysis," by Ruggiero, Murray A., Jr. (2005, The truth about intermarket analysis. Futures, 34, 48-51. Retrieved via Proquest on Sep. 5, 2012 (pp. 1-4).*

(Continued)

*Primary Examiner* — Jagdish Patel
*Assistant Examiner* — Sara C Hamilton
(74) *Attorney, Agent, or Firm* — Cuenot, Forsythe & Kim, LLC; Stanley A. Kim

(57) ABSTRACT

A method and a system for performing intermarket analysis. The method can include, from a pool of available markets in which at least one key intermarket has been selected and removed, selecting at least one market as a general intermarket, and removing the market selected as the general intermarket from the pool of available markets. From the pool of available markets from which the general intermarket has been removed, at least one market can be selected as a predictive intermarket and removed from the pool of available markets. Market data for each of the key intermarket, the general intermarket and the predictive intermarket can be processed to train a neural network. After training the neural network, market data for the primary market can be processed with the neural network to predict future market data for the primary market. The predicted future market data can be output.

3 Claims, 6 Drawing Sheets

U.S. PATENT DOCUMENTS

| | | | |
|---|---|---|---|
| 2005/0197889 | A1 | 9/2005 | Prigogin et al. |
| 2006/0004653 | A1 | 1/2006 | Strongin |
| 2006/0059065 | A1 | 3/2006 | Glinberg et al. |
| 2007/0100722 | A1* | 5/2007 | Ferguson et al. ............ 705/36 R |
| 2007/0143200 | A1* | 6/2007 | Muller et al. ............... 705/36 R |
| 2007/0156479 | A1 | 7/2007 | Long |
| 2008/0109379 | A1 | 5/2008 | Cofnas et al. |
| 2008/0177670 | A1 | 7/2008 | Reid |
| 2008/0208777 | A1 | 8/2008 | Stephens |
| 2008/0313065 | A1* | 12/2008 | Eder ............................... 705/35 |
| 2009/0018891 | A1* | 1/2009 | Eder ............................... 705/10 |
| 2009/0024504 | A1 | 1/2009 | Lerman et al. |
| 2009/0063359 | A1 | 3/2009 | Connors |
| 2009/0083195 | A1 | 3/2009 | Aymeloglu et al. |
| 2009/0192949 | A1* | 7/2009 | Ferguson et al. ............ 705/36 R |
| 2009/0198634 | A1* | 8/2009 | Ferguson et al. ............ 705/36 R |
| 2009/0313041 | A1 | 12/2009 | Eder |
| 2010/0191634 | A1* | 7/2010 | Macy et al. ...................... 705/35 |
| 2010/0217651 | A1* | 8/2010 | Crabtree et al. ................ 705/10 |
| 2011/0035331 | A1 | 2/2011 | Engel |
| 2011/0040666 | A1* | 2/2011 | Crabtree et al. ................ 705/37 |
| 2011/0071882 | A1* | 3/2011 | Jakagnanam et al. .......... 705/10 |
| 2011/0137821 | A1 | 6/2011 | Mendelsohn |

OTHER PUBLICATIONS

"Using neural nets the right way," Ruggiero, Murray A., Jr. Futures 35. 10 (Aug 2006): 40-43. Retrieved via Proquest on Sep. 5, 2012 (pp. 1-5).*

Mendelsohn, Louis B., "Forex Trading Using Intermarket Analysis", Mar. 8, 2006, Marketplace Books, ISBN-10: 1592802958, ISBN-13: 978-1592802951, Abstract only.

Mendelsohn, Louis B., "Trend Forecasting with Technical Analysis: Unleashing the Hidden Power of Intermarket Analysis to Beat the Market", Dec. 11, 2000, Marketplace Books, ISBN-10: 1883272912, ISBN-13: 978-1883272913, Abstract only.

Ho, Trang, "Exchange Traded Funds—Using ETFs to see Market's Warning Signs," Jun. 16, 2009, Investor's Business Daily, Abstract only.

Brabazon, Tony, "A Connectivist Approach to Index Modelling in Financial Markets," Aug.-Sep. 2000, Coil Summer School, University of Limerick, Abstract only.

Ruggiero, M. A., Jr., "Using Neural Nets the Right Way," Aug. 2006, Futures, Chicaco, n10; p. 40, Abstract only.

Chung, K.K.: "Financial Forecasting Using Neural Network or Machine Learning Techniques," Oct. 2001, Electrical Engineering Thesis Project, Abstract only.

Mendelsohn, L.B.: "Trend Forecasting with Intermarket Analysis: Predicting Global Markets with Technical Analysis, " May 31, 2008, Abstract only.

Lawrence, R.: "Using Neural Networks to Forecast Stock Market Prices," Dec. 12, 1997, University of Manitoba, Department of Computer Science, Abstract only.

Stevens, L. "Essential Technical Analysis: Tools and Techniques to Spot Market Trends," Mar. 22, 2002, Wiley, 1st edition, ISBN-10: 047115279X, ISBN-13: 9780471152798, Abstract only.

Tradersworld.com: "VantagePoint Intermarket Analysis Software," Dec./Jan. 2011, <<www.tradersworld.com>>.

TME: "VantagePoint prediction software for sale," T2W Forum, Feb. 12, 2009, <<www.trade2win.com>>.

\* cited by examiner

200

Key Global
Intermarkets
202

| Intermarket 210 |
| Intermarket 212 |
| Intermarket 214 |

Key Sector
Intermarkets
204

| Intermarket 220 |
| Intermarket 222 |
| Intermarket 224 |

Key Category
Intermarkets
206

| Intermarket 230 |
| Intermarket 232 |
| Intermarket 234 |

Key Market Specific
Intermarkets
208

| Intermarket 240 |
| Intermarket 242 |
| Intermarket 244 |

FIG. 2

| | Daily | Hourly | Minute |
|---|---|---|---|
| Long-Term Trend | Intermarket 410 | Intermarket 420 | Intermarket 430 |
| Mid-Term Trend | Intermarket 412 | Intermarket 422 | Intermarket 432 |
| Short-term Trend | Intermarket 414 | Intermarket 424 | Intermarket 434 |

400

500

|  | Daily | Hourly | Minute |
|---|---|---|---|
| Next Open Price | Intermarket 510 | Intermarket 530 | Intermarket 550 |
| Next High Price | Intermarket 512 | Intermarket 532 | Intermarket 552 |
| Next Low Price | Intermarket 514 | Intermarket 534 | Intermarket 554 |
| Next Close Price | Intermarket 516 | Intermarket 536 | Intermarket 556 |
| Next Volume | Intermarket 518 | Intermarket 538 | Intermarket 558 |
| +2 Typical Price | Intermarket 520 | Intermarket 540 | Intermarket 560 |
| +3 Typical Price | Intermarket 522 | Intermarket 542 | Intermarket 562 |
| +4 Typical Price | Intermarket 524 | Intermarket 544 | Intermarket 564 |

FIG. 5

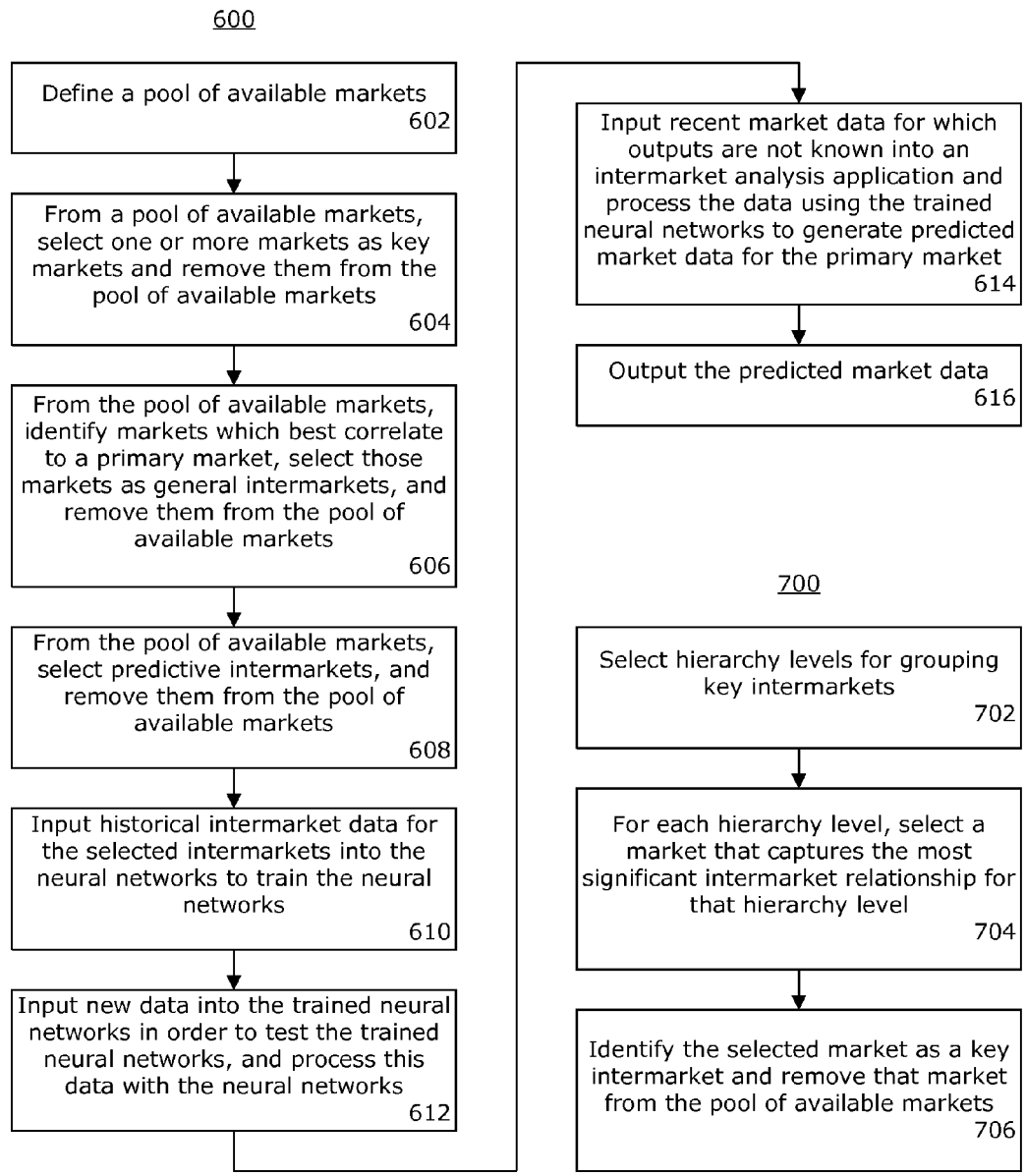

INTERMARKET ANALYSIS

FIELD OF THE INVENTION

The invention relates generally to technical analysis of financial markets. More particularly, the invention relates to methods and systems for performing intermarket analysis.

BACKGROUND

Stock and commodity exchanges provide real-time, delayed, and end-of-day price data in a standard format that is used by a variety of trading applications. This data is normally displayed on charts as vertical bars that each summarize activity over a period of time by recording the open price at the beginning, the highest and lowest price during the period, and the close price at the end. The bars are continuously recorded producing a stream of time-series data with a date and time associated with each.

Historically, the methods that have been used by traders to analyze the financial markets in an effort to identify and forecast the direction of price trends have been divided into two distinct approaches: fundamental analysis and technical analysis. Fundamental analysis focuses on underlying macroeconomic and/or micro-economic factors such as Gross National Product, central bank policies, rates of inflation, unemployment rates, market share, earnings, profitability and supply/demand. The premise behind technical analysis is that all of the factors that affect a specific market at any given point in time are already built into that market's price, even if these factors are based on fundamentals or mass-psychology.

SUMMARY

The present invention relates to a method and a system for performing intermarket analysis. The method can include, from a pool of available markets in which at least one key intermarket has been selected and removed, selecting at least one market as a general intermarket, and removing the market selected as the general intermarket from the pool of available markets. From the pool of available markets from which the general intermarket has been removed, at least one market can be selected as a predictive intermarket and removed from the pool of available markets.

Market data for each of the key intermarket, the general intermarket and the predictive intermarket can be processed to train a neural network so that when the neural network processes input data, predictive output data generated by the neural network is close to desired output data. After training the neural network, market data for the primary market can be processed with the neural network to predict future market data for the primary market. The predicted future market data can be output.

BRIEF DESCRIPTION OF THE DRAWINGS

FIG. 2 depicts a plurality of key intermarkets, which are useful for understanding the present invention.

FIG. 5 depicts a plurality of predictive intermarkets, which are useful for understanding the present invention.

FIG. 6 is a flowchart presenting a method of performing intermarket analysis, which is useful for understanding the present invention.

FIG. 7 is a flowchart presenting a method of selecting key intermarkets, which is useful for understanding the present invention.

DETAILED DESCRIPTION

Figure 1:
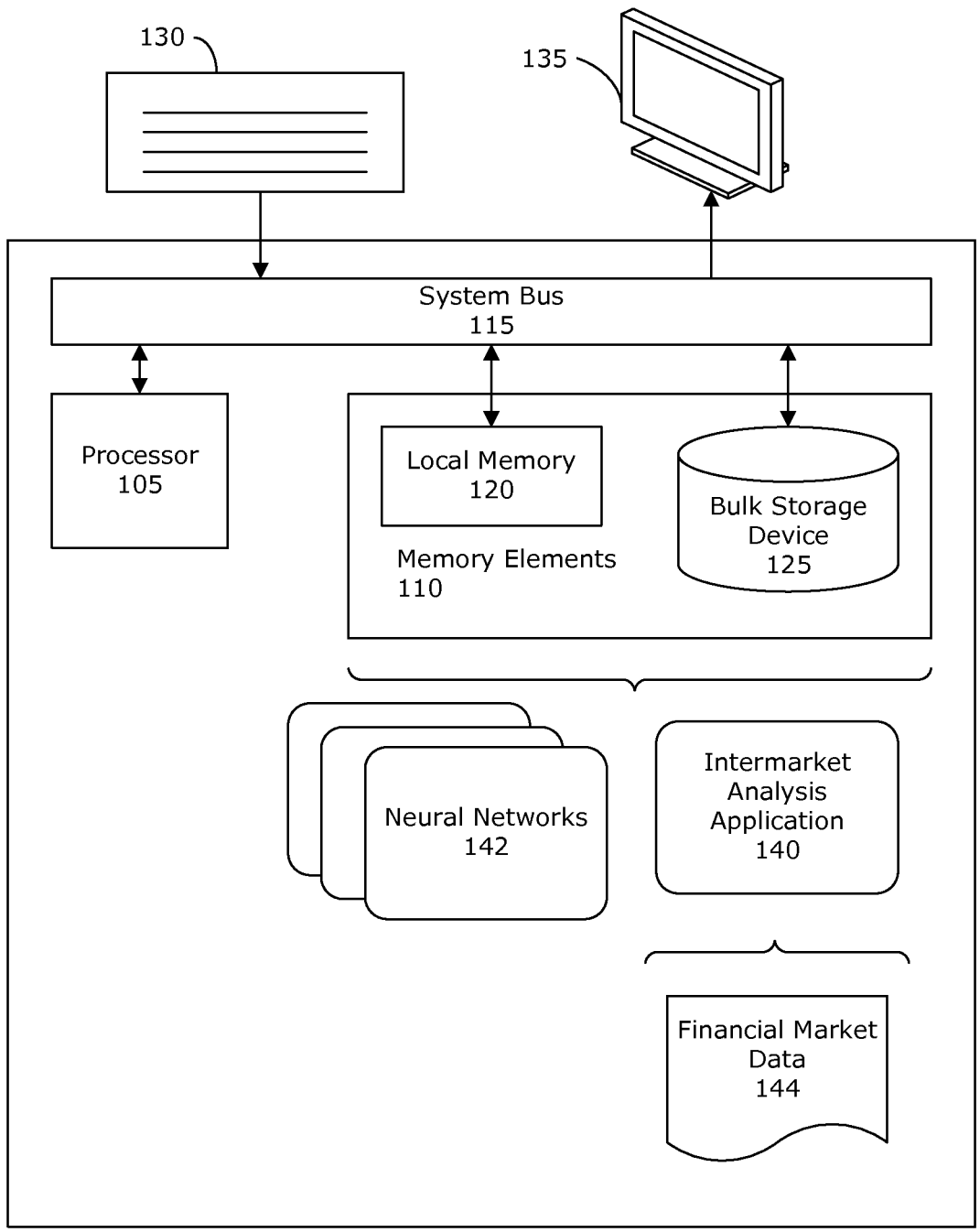
FIG. 1 depicts a system that performs financial market analysis, which is useful for understanding the present invention.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating a processing system (hereinafter "system") 100 for performing financial market analysis in accordance with one embodiment of the present invention. In one aspect, the system 100 can include at least one processor 105 coupled to memory elements 110 through a system bus 115. As such, the system 100 can store program code within one or more memory elements 110. The processor 105 can execute the program code accessed from the memory elements 110 via the system bus 115. In one aspect, for example, the system 100 can be implemented as a computer that is suitable for storing and/or executing program code. It should be appreciated, however, that the system 100 can be implemented in the form of any system comprising a processor and memory that is capable of performing the functions described within this specification.

The memory elements 110 can include one or more physical memory devices such as, for example, local memory 120 and one or more bulk storage devices 125. The term local memory 120 refers to random access memory or other non-persistent memory device(s) generally used during actual execution of the program code. The bulk storage device(s) 125 can be implemented as a hard drive, a solid state disk, or other persistent data storage device. The system 100 also can include one or more cache memories (not shown) that provide temporary storage of at least some program code in order to reduce the number of times program code must be retrieved from the bulk storage device 125 during execution.

Input/output (I/O) devices such as a keyboard 130, a display 135, and a pointing device (not shown) optionally can be coupled to system 100. The I/O devices can be coupled to the system 100 either directly or through intervening I/O controllers. Network adapters also can be coupled to system 100 to enable system 100 to become coupled to other systems, computer systems, remote printers, and/or remote storage devices through intervening private or public networks. Modems, cable modems, and Ethernet cards are examples of different types of network adapters that can be used with the system 100.

As pictured in FIG. 1, the memory elements 110 can store an intermarket analysis application 140. The intermarket analysis application module 140, being implemented in the form of executable program code, can be executed by the processor 105 to implement the methods and processes described herein.

The system further can include a plurality of artificial neural networks (hereinafter referred to as "neural networks") 142. As used herein, a neural network is a mathematical algorithm implemented with executable program code that includes objects that model neurons and synapses of a brain. The neural network 142 can be organized into an input layer, one or more hidden layers, and an output layer. The objects that model neurons and synapses can be contained in the hidden layers.

A neural network 142 may be trained on one or more sets of data that include both input data and data corresponding to desired output data of the neural network 142. The training process can adjust the weights of neuron objects in a guided fashion until processing of the input data by the neural network (e.g., multiplying the input data by hidden weights associated with the neuron objects), generates predicted output data that is as close as possible to the desired output data. For example, the input data can be market data for a primary market for a particular period, and the desired output data can be market data for the primary market for a later period. Once trained, input data for which the corresponding output data is unknown can be fed into the neural network 142, and the neural network 142 can process the input data to produce predicted output data.

Data generated by the intermarket analysis application can be output to, and stored within, memory elements 110. As used herein, "outputting" and/or "output" can mean storing in the memory elements 110, for example, writing to a file stored in the memory elements 110, writing to the display 135 or other peripheral output device, playing audible notifications, sending or transmitting to another system, exporting, or the like. Data that is to be processed by the neural networks 142 can be accessed from the memory elements 110 as may be required. Any suitable form of communication between the intermarket analysis application 140 and the neural networks 142 may be implemented to coordinate passing of data, as would be known to those skilled in the art.

In operation, the intermarket analysis application 140 can process financial market data 144 to identify, classify and grade relationships between financial markets and/or financial market segments, and generate predictions of future market prices for the primary market or market segment that is of interest, which may be a financial market or a financial market segment. The market data 144 can include data from all financial markets and/or financial market segments available for analysis. Unless otherwise specified herein, the term "market" will be used herein to refer to a financial market, and will be used to refer to a financial market segment. Thus, market data can be data corresponding to a financial market or data corresponding to a financial market segment.

As used herein, a financial market is a system through which people buy and sell (trade) financial securities (such as stocks and bonds), commodities (such as precious metals or agricultural goods), and other fungible items. As used herein, an intermarket is a financial market segment or a specific type of stock or commodity to which prices of a selected primary market of interest are related. For example, oil is used to make gasoline. Therefore oil is an intermarket for gasoline. Thus, an increase in the price of oil would likely precede an increase in the price of gasoline. Thus, if gasoline is selected to be a primary market, the oil market can be an intermarket for the primary market.

Intermarkets whose price activities lead that of a primary market of interest (e.g., a primary market, a market segment, a category or another intermarket) are especially useful for financial forecasting, and such intermarkets can be selected as appropriate on a market-by-market basis to provide financial data for training of the neural networks 142. Training the neural networks 142 in this manner can improve the accuracy of the neural network predictions for future market activity (e.g., market prices, trading volume, etc.).

The predictions of the neural networks 142 can be output to predict future market values in a time series. As long as the data being processed by the neural networks 142 is similar to the training data, the predictions will be approximately as accurate as the results obtained during training. The accuracy of the prediction depends on many factors, one of which is the presence of patterns in the data and the relationship between the input data and the data being predicted.

The market data 144 that is used to train the neural networks 142 can be received from an electronic market exchange or from any other suitable source. In addition, technical indicators also can be used to predict the future activity of a market. The technical indicators can be generated from the market data 144, received from an electronic market exchange, or received from another suitable source.

Referring now to FIG. 2, a plurality of key intermarkets 200 are depicted which are useful for understanding the present invention. The key intermarkets 200 can include key intermarkets for each of a plurality of intermarket levels in an intermarket hierarchy. The hierarchy levels that are used can be those defined in a suitable market classification system, for instance Standard & Poor's Global Industry Classification System or the U.S. Government's North American Industry Classification System, but the invention is not limited in this regard. By way of example, the hierarchy levels can include a global intermarket level 202, a sector intermarket level 204, a category intermarket level 206, and a market specific intermarket level 208.

For each hierarchy level 202-208, one or more key intermarkets can be selected. For example, intermarkets 210, 212, 214 can be selected as key global intermarkets; intermarkets 220, 222, 224 can be selected as key sector intermarkets; intermarkets 230, 232, 234 can be selected as key category intermarkets; and intermarkets 240, 242, 244 can be selected as key market specific intermarkets. Notwithstanding these examples, any number of key intermarkets can be selected for each of the hierarchy levels 202-208, and the number of key intermarkets need not be consistent across the hierarchy levels 202-208. For instance, the number of key global intermarkets can differ from the number of key sector intermarkets, and so on. Further, the number of hierarchy levels and/or the number of key intermarkets selected for each hierarchy level can be increased or decreased as desired to capture the most significant intermarket relationships.

In one arrangement, these key intermarkets 210-244 can be selected by market experts. As used herein, a "market expert" is a person. In another arrangement, information from any of a variety of rating agencies can be used to select the key intermarkets 210-244. In yet another arrangement, the key intermarkets 210-244 can be selected by an application, for instance the intermarket analysis application, which performs a fundamental analysis on various intermarkets and selects the key intermarkets 210-244 accordingly.

Intermarket analysis based on fundamental indicators may be used as a means of assessing the supply/demand and price impact on different intermarkets that are most closely related. In illustration, a fundamental analysis can be performed on a product supply chain to identify fundamental indicators which can be use to predict movement in a related intermarket. For example, raw material markets are good key intermarkets for companies that produce products in which the raw materials are used, and thus can provide a useful indication of future market activity for those companies. Another type of fundamental analysis can be performed to identify an inverse relationship between competitors. For example, COCA-COLA® can be a key intermarket for PEPSI®, and the market activity for those companies may be inversely related. Another fundamental analysis can be performed on industry or technology leaders. HEWLET PARKARD® for example, might be a key intermarket for DELL® or other computer manufacturers.

There also are industry or sector indices. Such indices can be good intermarkets for the companies in those industries or sectors. Further, exchange rates can be a key intermarket for companies that import/export products. In addition, intermarkets, such as oil, gold, and the Dow Jones Industrial Average, have a broad influence on markets, and thus can be good key intermarkets that are generally applicable to all markets.

From a fundamental perspective, the key intermarkets are those that have the most weight or influence on the supply/demand outcome of a target market. For example, since investors do not have infinite financial resources, the actions they take pertaining to bonds typically will depend on what is happening in a key intermarket, such as stocks. Farmers do not have an infinite amount of land, so a decision in one commodity market will typically affect the fate of other commodities.

There are multiple facets to selecting a key intermarket. One facet can be the degree that a decision in one key intermarket affects another market. Another facet for selecting a key intermarket can be a comparison of current data with past data and identifying how prices reacted to similar data in the past. If interest rates are low, stocks are likely to attract more investment money than they would when interest rates are high. The amount of the investment put into socks typically depends on the prevailing and expected levels of interest rates, among other factors. In another example, if a thirteen billion bushel corn crop was bearish for corn prices in the past, it likely will be bearish in the present, all other things being equal, and the effect on soybean prices will likely be similar to what occurred in the past when there was a thirteen billion bushel corn crop.

After a particular intermarket is selected as a key intermarket and associated with a particular hierarchy level 202-208, it can be removed from a pool of available markets so as to prevent it from being selected as a key intermarket more than once. Moreover, such intermarkets can remain unavailable for selection as general intermarkets or predictive intermarkets, both of which will be described herein. This gives the neural network a good opportunity to exploit more intermarket relationships.

Figures 3, 4:
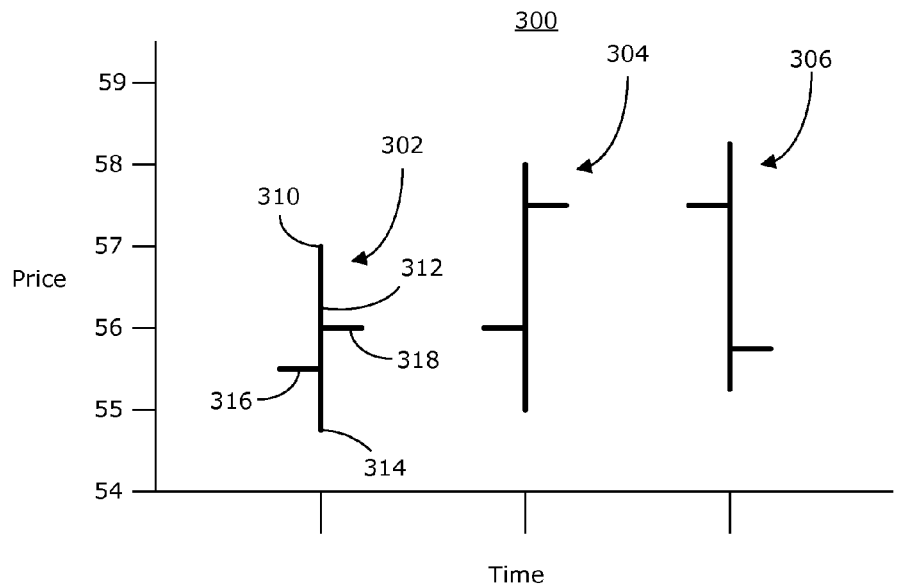
FIG. 3 depicts a bar chart, which is useful for understanding the present invention.
FIG. 4 depicts a plurality of general intermarkets, which are useful for understanding the present invention.

FIG. 3 depicts a bar chart 300, which is useful for understanding the present invention. The bar chart 300 can be used to evaluate the performance of a particular financial instrument over a particular period. Within the bar chart 300, a plurality of bars 302, 304, 306 are depicted. As used herein, a bar is a style of chart that may be used to perform technical analysis on a market. The bars 302, 304, 306 represent data that may be used to determine the correlations between financial instruments associated with various markets, and thus can be evaluated for selecting intermarkets.

Referring to the bar 302, a top 310 of a vertical line 312 can indicate the highest price at which a financial instrument traded during a particular period such as minute, hour, day, etc. ("bar duration"), and a bottom 314 of the vertical line 312 can indicate the lowest price at which the financial instrument traded. The opening price of the financial instrument for the given period is shown by a horizontal line 316 on the left side of the bar 302, and the closing price of the financial instrument is shown by a horizontal line 318 on the right side of the bar 302. The bars 302, 304, 306 can be presented in sequential order corresponding to their respective periods.

FIG. 4 depicts a plurality of general intermarkets 400, which are useful for understanding the present invention. The general intermarkets 400 can be selected from a pool of all markets supported by the system after the key intermarkets have been selected and removed from the pool. Each market that is selected to be a general intermarket 400 can be identified based on its correlation to a primary market. After a particular market is selected as a general intermarket 400, that market can be removed from the pool of available intermarkets to prevent that market from being selected more than once as a general intermarket. Moreover, removing the market from the pool also can prevent that market from being selected as a predictive intermarket. Predictive intermarkets will be discussed herein.

The following example describes how the general intermarkets can be selected. From among markets remaining in the pool of available markets after one or more key intermarkets have been selected, an intermarket 410 that has a highest level of long-term correlation with a primary market based on daily bar data can be selected as a general intermarket and associated with the long-term daily trend of the primary market. The intermarket 410 then can be removed from the pool of available markets. Similarly, from the available pool of markets, an intermarket 412 that has a highest level of mid-term correlation with a primary market based on daily bar data can be selected as a general intermarket and associated with the mid-term daily trend of the primary market. An intermarket 414 that has a highest level of short-term correlation with a primary market based on daily bar data can be selected as a general intermarket and associated with the short-term daily trend of the primary market. The intermarkets 412 and 414 also can be removed from the pool of available markets after they have been selected.

Intermarkets 420, 422, 424 having the highest levels of correlation with a primary market based on hourly bar data can be selected as general intermarkets from the pool of available markets in a similar manner and associated with corresponding bars and trends. In addition, intermarkets 430, 432, 434 having the highest levels of correlation with a primary market based on minute bar data can be selected as general intermarkets in this manner and associated with corresponding bars and trends. Again, as the intermarkets 420-434 are selected, they can be removed from the pool of available markets so as to prevent them from being selected more than once.

In one aspect of the inventive arrangements, rather than selecting a pre-defined number of general intermarkets, the number of general intermarkets to be selected can be determined by suitable criteria, such as a correlation threshold. For example, any market with a correlation above ninety percent for daily bars using the long-term trend can be selected as a general intermarket, and can be associated with the long-term trend for daily bars of the primary market.

When comparing intermarket data to primary market data to determine a level of correlation, exponential moving averages of the data to be compared can be used. For example, to determine long-term daily correlation between an intermarket and the primary market, twenty day exponential moving averages can be used. In other arrangements, simple or weighted moving averages can be used. Still, any other desired representation of the data can be used for the purpose of determining correlation and the invention is not limited to these examples.

General intermarkets also can be selected based on their correlation to monthly trends, or trends from any other periods. Further, rather than determining correlations to bar chart data, general intermarkets can be selected based on correlations to any aggregation of historical price data. For example, correlations between intermarkets and real-time bids, quotes, and asks can be determined, and general intermarkets can be selected based on these correlations.

As used herein, a correlation indicates a degree and type of relationship between two sets of data. A positive correlation indicates that two series of data points generally reflect movement in the same direction. That is, two markets which have a positive correlation move together in the same direction. A negative correlation indicates that two series of data points generally reflect movement in opposite directions. In other words, two markets which have a negative correlation move in opposite directions. A zero correlation indicates the two series of data points vary independently of each other.

A technical indicator (e.g., 0, a positive number, or a negative number) can be generated for each general intermarket to indicate how closely that intermarket correlates with a particular target market. When selecting significant intermarkets, the absolute value of their correlations against a reference market can be evaluated, and those with the highest correlations can be identified. In this regard, an intermarket having a "−8" correlation can be selected over an intermarket having a "+3" correlation.

FIG. 5 depicts a plurality of predictive intermarkets 500, which are useful for understanding the present invention. For each of a plurality of period categories, such as daily bars, hourly bars, minute bars, etc., a plurality of markets can be selected as predictive intermarkets. Each of the predictive intermarkets selected for each period category can correspond to a particular type of data to be predicted. For instance, for the daily bar category, an intermarket 510 can be selected to correspond to a next open price, an intermarket 512 can be selected for a next high price, an intermarket 514 can be selected to correspond to a next low price, an intermarket 516 can be selected to correspond to a next close price, and an intermarket 518 can be selected to correspond to a next volume. In addition, an intermarket 520 can be selected to correspond to a typical price two periods later (e.g., two days later), an intermarket 522 can be selected to correspond to a typical price three periods later (e.g., three days later), and an intermarket 524 can be selected to correspond to a typical price four periods later (e.g., four days later). Similarly, intermarkets 530, 532, 534, 536, 538, 540, 542, 544 can be selected for an hourly bar category, and intermarkets 550, 552, 554, 556, 558, 560, 562, 564 can be selected for a minute bar category. Of course, the present invention is not limited to these examples. For example, any number of future periods can be associated with the period categories.

The predictive intermarkets 500 can be selected from the pool of all available markets, after the selected key and general intermarkets have been removed, based on improvement metrics. Specifically, from among the markets remaining in the pool of available markets, an intermarket having the best improvement metric for a particular type of prediction and bar duration can be selected and associated with that prediction type and bar duration. The improvement metric can relate to a level of improvement made to a neural network making a particular prediction on a particular bar duration, or an assigned grade. In this regard, the levels of improvement and grades described herein may be collectively referred to as "improvement metrics."

In illustration, a level of improvement can be measured by a variety of statistics including, but not limited to, accuracy, average error, and mean squared error. The markets being considered for selection as the predictive intermarkets also can be assigned grades based on their impact on at least one measure of criteria in a trading simulation. The measure of criteria can be a measure of profitability, a measure of maximum drawdown, a number of trades, or any other criteria that may be measured in a trading simulation. The markets that are selected as the predictive intermarkets then can be selected based on their respective grades.

After a particular market is selected as a predictive intermarket and associated with a particular bar duration and type of prediction, it may be removed from the pool of available markets so as to prevent it from being selected more than once. Thus, if a particular market has the best improvement metric for a particular bar duration and prediction type, but that market has already been selected to be a predictive intermarket for another bar duration and/or type of prediction, a market with the next best improvement metric can be selected from the markets remaining in the pool of markets.

The key intermarkets 200, general intermarkets 300, and predictive intermarkets 500 can be used to train the neural networks to make each prediction for the primary market using historical data corresponding to the selected intermarkets and the primary market data. All selected intermarkets, regardless of how they were selected, can form a pool of intermarkets that are used to train the neural networks for making predictions for a primary market.

The training process can grade each intermarket, keeping those which improve the solution and discarding those which do not. Such data can include both input data and output data. The training process can adjust the weights of neuron objects contained in neural network hidden layers. These weights can be adjusted in a guided fashion until the input data, when multiplied by the weights, output predictive data as close as possible to the corresponding actual market data of the primary market. As noted, once the neural networks have been trained, input data for which the output data is unknown can be entered into the neural networks, and the neural networks can generate predicted market data for the desired primary market or market segment and output that data.

FIG. 6 is a flowchart presenting an intermarket analysis method 600 that is useful for understanding the present invention. At step 602, a pool of available markets can be defined. For example, the pool of markets can include all markets for which suitable market data is available to the system.

At step 604, from the pool of available markets, one or more markets can be selected as key intermarkets and removed from the pool of available markets. At step 606, from the pool of available markets, markets which best correlate to the primary market can be identified. Those markets can be selected as general intermarkets and removed from the pool of available markets.

At step 608, from the pool of available markets, markets whose price activity leads that of the primary market of interest can be identified and selected as predictive intermarkets. These intermarkets also can be removed from the pool of available markets as they are selected. At step 610, the historical market data of all of the selected intermarkets can be input into the neural networks and the predicted results can be compared with the actual historical market activity of the primary market. The neural networks can continually adjust the weights of the hidden neurons until the predicted results are as close as possible to the actual market activity of the primary market.

At step 612, new data can be input to the trained neural networks in order to test the trained neural networks, and the neural networks can process this data. This test can be performed to ensure that the predicted market data retains its accuracy. The trained and tested neural networks then can be configured to be made available to the intermarket analysis application.

At step 614, recent market data for which the outputs are not known can be input into the intermarket analysis application, and processed using the trained neural networks to generate predicted market data for the primary market. As noted, the neural networks can apply hidden layer weights to produce the predicted market data. At step 616, the predicted market data can be output. For example, the predicted market data can be output to a display, to a memory element, communicated to another electronic system, and so on.

FIG. 7 is another flow chart presenting a key intermarket selection method 700 that is useful for understanding the present invention. The method 700 may be implemented at step 604 of FIG. 6 to select the key intermarkets.

At step 702, hierarchy levels for grouping key intermarkets can be selected. At step 704, for each hierarchy level, a market can be selected from the pool of available markets. The selected market can be the one that captures the most significant intermarket relationship. At step 706, the selected market can be identified as a key intermarket and associated with the specific hierarchy level. Further, the selected market can be removed from the pool of available markets.

Figure 8:
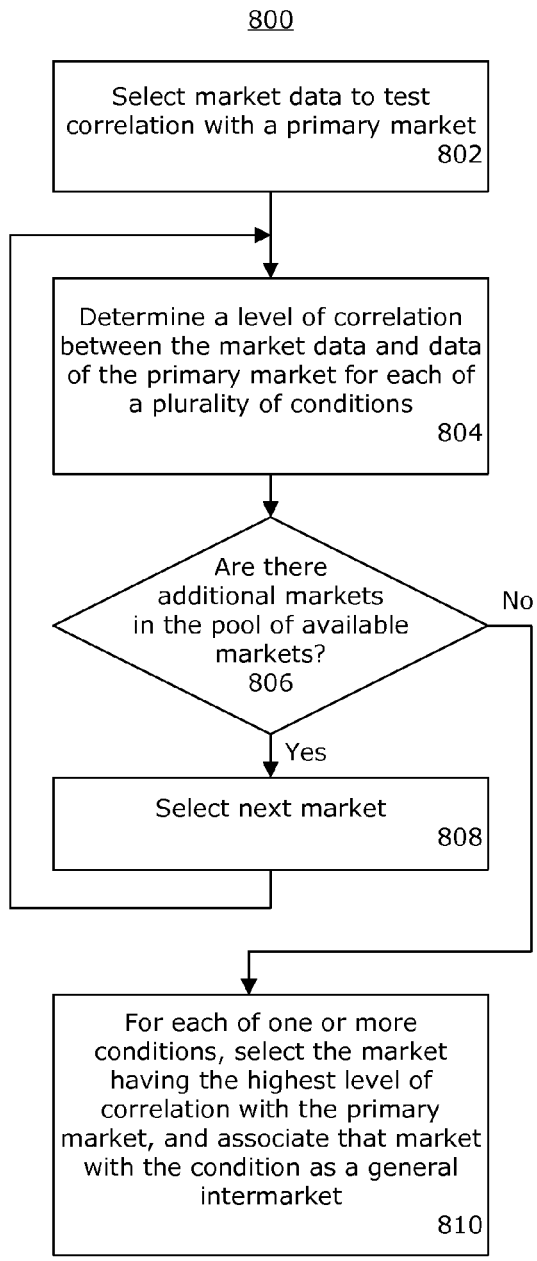
FIG. 8 is a flowchart presenting a method of selecting general intermarkets, which is useful for understanding the present invention.

FIG. 8 is another flowchart presenting a general intermarket selection method 800 that is useful for understanding the present invention. The method 800 may be implemented at step 606 of FIG. 6 to select the general intermarkets.

At step 802, a market and its market data can be selected from the pool of available markets. At step 804, a level of correlation between the selected market data and data of the primary market can be determined for each of a plurality of conditions. Referring to decision box 806, if there are additional markets in the pool of markets, at step 808 another market can be selected. If, however, there are no additional markets in the pool of available markets, the process can proceed to step 810.

At step 810, for each of one or more of the conditions, the market having the highest level of correlation with the primary market can be selected and associated with that condition as a general intermarket for the primary market. As noted, the condition can be a particular bar duration (e.g., month, week, day, hour, minute, etc.) and particular type of prediction (e.g., long-term, mid-term, short-term, etc.). Also as noted, a general intermarket can only be associated with one condition. So, once a market is selected as a general intermarket for a particular condition, it can be removed from the pool of available markets, and thus will not be available to be associated with any other conditions. That is, for each condition for which a general intermarket is to be associated, a different intermarket will be selected.

Figure 9:
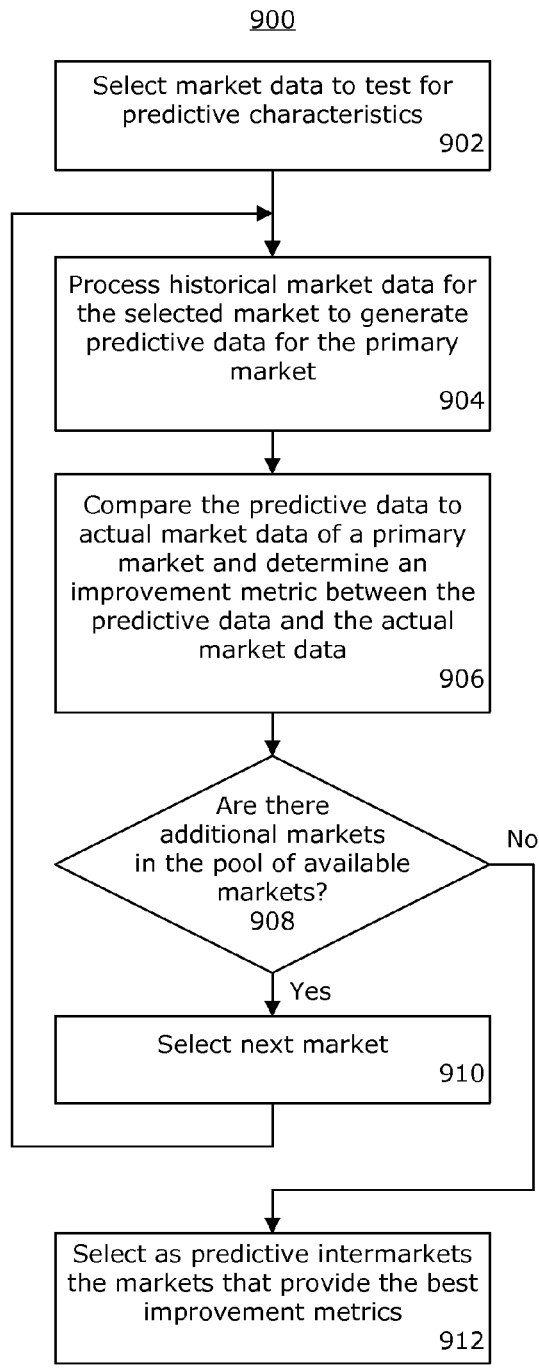
FIG. 9 is a flowchart presenting a method of selecting predictive intermarkets, which is useful for understanding the present invention.

FIG. 9 is another flowchart presenting a predictive intermarket selection method 900 that is useful for understanding the present invention. The method 900 may be implemented at step 608 of FIG. 6 to select the predictive intermarkets.

At step 902, a market and its market data can be selected from the pool of available markets in order to test for predictive characteristics. At step 904, historical market data for the selected market can be processed to generate predictive data for the primary market. At step 906, the predictive data can be compared to actual market data of the primary market and an improvement metric between the predictive data and the actual primary market data can be established for the primary market.

Referring to decision box 908, if there are additional markets in the pool of available markets, at step 910 a next intermarket can be selected, and the process can return to step 904. If, however, there are no additional markets the process can proceed to step 912. At step 912, the intermarkets that provide the best improvement metrics can be selected as predictive intermarkets. Each of these predictive intermarkets can be associated with a particular type of prediction and bar duration.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of obtaining predicted future market data for a primary market using a computer comprising a neural network, the method comprising the steps of:
processing training data inputted to the neural network until the neural network is trained to generate predictive output data that is close to the actual market data for the primary market, the training data comprising market data for at least one key intermarket of the primary market, market data for at least one general intermarket of the primary market, and market data for at least one predictive intermarket of the primary market, wherein (i) the at least one key market comprises at least one market known to have the most influence on the supply/demand outcome of the primary market, is selected from a first pool of intermarkets, and is removed from the first pool of intermarkets to yield a second pool of intermarkets; (ii) the at least one general intermarket comprises the market in the second pool that best correlates with the primary market, is selected from the second pool of intermarkets, and is removed from the second pool of intermarkets to yield a third pool of intermarkets; (iii) and the at least one predictive intermarket comprises the market in the third pool of intermarkets whose price activity most closely leads that of the primary market;
using the trained neural network to process market data for the primary market inputted to the trained neural network to obtain predicted future market data for the primary market; and
outputting the predicted future market data from the trained neural network.

2. A system for obtaining predicted future market data for a primary market, the system comprising a processor comprising a neural network, the processor configured to:
process training data inputted to the neural network until the neural network is trained to generate predictive output data that is close to the actual market data for the primary market, the training data comprising market data for at least one key intermarket of the primary market, market data for at least one general intermarket of the primary market, and market data for at least one predictive intermarket of the primary market, wherein (i) the at least one key market comprises at least one market known to have the most influence on the supply/demand outcome of the primary market, is selected from a first pool of intermarkets, and is removed from the first pool of intermarkets to yield a second pool of intermarkets; (ii) the at least one general intermarket comprises the market in the second pool that best correlates with the primary market, is selected from the second pool of intermarkets, and is removed from the second pool of intermarkets to yield a third pool of intermarkets; (iii) and the at least one predictive intermarket comprises the market in the third pool of intermarkets whose price activity most closely leads that of the primary market;
process market data for the primary market inputted to the trained neural network to obtain predicted future market data for the primary market; and
output the predicted future market data.

3. A computer program product comprising:

a non-transitory, computer-usable medium comprising computer-usable program code that uses a neural network to perform intermarket analysis to predict future market data for a primary market, the computer-usable medium comprising:

executable computer-usable program code that processes training data inputted to the neural network until the neural network is trained to generate predictive output data that is close to the actual market data for the primary market, the training data comprising market data for at least one key intermarket of the primary market, market data for at least one general intermarket of the primary market, and market data for at least one predictive intermarket of the primary market, wherein (i) the at least one key market comprises at least one market known to have the most influence on the supply/demand outcome of the primary market, is selected from a first pool of intermarkets, and is removed from the first pool of intermarkets to yield a second pool of intermarkets; (ii) the at least one general intermarket comprises the market in the second pool that best correlates with the primary market, is selected from the second pool of intermarkets, and is removed from the second pool of intermarkets to yield a third pool of intermarkets; (iii) and the at least one predictive intermarket comprises the market in the third pool of intermarkets whose price activity most closely leads that of the primary market;

executable computer-usable program code that, after the neural network is trained, processes market data for the primary market inputted to the trained neural network to obtain predicted future market data for the primary market; and executable computer-usable program code that outputs the predicted future market data.

* * * * *